Patented June 1, 1948

2,442,341

UNITED STATES PATENT OFFICE 2,442,341

STABILIZED AQUEOUS RUBBER DISPERSIONS

Malcolm R. Buffington, Millburn, N. J.

No Drawing. Application September 22, 1942, Serial No. 459,298

5 Claims. (Cl. 260—820)

1

The present invention relates to a composition of matter and a method of producing the same, and more particularly to a highly stabilized aqueous rubber dispersion adapted for storage over long periods of time and for shipment without producing coagulation of the rubber constituents or of portions thereof, and to a method of producing the same to render it applicable for the making of road expansion joints in situ, and the like commercial applications, in which a premature coagulation of the rubber latex or aqueous rubber dispersion constituent would result in failure, with resulting delays and financial losses.

This invention is based upon a discovery by means of which natural rubber latex and admixtures thereof with aqueous dispersions of reclaimed rubber may be shipped without coagulation or change in viscosity to the locality where the material is to be used for the compounding of the expansion joint material and applied between sections of concrete of a road bed, or other similar uses. The expansion joint composition and method of forming the same, to which the present invention is particularly applicable, are disclosed in my Patent No. 2,257,083, for a composition of matter, patented September 23, 1941, and comprises in its preferred form the use of substantially equal volumes of a solid material, including expanded mica, bentonite and rubber compounding material, and a liquid material of natural rubber latex, or an aqueous rubber dispersion, composed preferably of 50% of natural rubber latex and 50% of artificially prepared aqueous dispersion of reclaimed rubber.

In the making of the expansion joint composition as disclosed and claimed in the said patent, it is substantially necessary to compound the ingredients of the road joint at the locality or place where the composition is to be used, for the reason that if the ingredients were mixed prior to shipment, or mixed a considerable period of time prior to the pouring of the composition into the road joint, the rubber composition would vulcanize or be partially vulcanized and coagulated so that the composition could not be poured into place between the concrete sections of the road bed as required. The solid ingredients are therefore directly mixed with the aqueous rubber dispersion immediately prior to being poured into the joint so as to provide a fluid composition which may be readily poured into the joint from a suitable container.

If any substantial variation in the viscosity of the rubber latex or aqueous rubber dispersion takes place prior to admixture with the solid materials, the expansion joint composition will lack uniformity and difficulties will be experienced in the pouring of the composition into the joint. If the admixed materials are too thick or viscous, it is difficult to pour the composition into the confined space between the concrete sections, and if the composition is too thin, a partial settling of the solids may take place by which the composition would lack uniformity and could not be properly poured into the joint.

In order to prevent, as far as possible, the coagulation or deposit of rubber masses in the aqueous rubber dispersions during transit of the material in drums or containers to the place where they are to be used, various prior known stabilizers for rubber latex have been used and experimented with, but without success under the operating conditions imposed in the making of the expansion joint composition of my patented invention between the concrete sections of the road bed under commercial conditions of operation. It was found that in shipping aqueous rubber dispersion in drums or containers of the usual form with the prior known stabilizers for rubber dispersions, certain changes frequently took place in the aqueous rubber dispersions with changes in viscosity, and frequently coagulation of rubber occurred in the containers to a greater or less extent, resulting in an unsatisfactory admixture of the ingredients of the expansion joint composition, and rejection of the latex or dispersion of rubber was frequently necessary in cases in which excessive coagulation had taken place. When natural rubber latex admixed with reclaimed rubber dispersion was shipped in the drums with the prior known stabilizers, the change in viscosity and the extent of coagulation of the rubber was even more marked than in the case of natural rubber latex, and necessitated a change in the procedure in connection with the making of the expansion joint, requiring a substantially better stabilizer to prevent coagulation, or a change in the mode of shipment to overcome the difficulties encountered.

In order to prevent such coagulation of the aqueous rubber dispersions during shipment, a special paint material was developed for coating the inside surfaces of the drums or containers, this paint composition being disclosed and claimed in my Patent No. 2,262,092, issued November 11, 1941. The paint material therein disclosed is particularly effective for preventing such coagulation and change in viscosity, and is applicable under all conditions in which the containers are available for painting or coating prior to the introduction of the rubber latex or aqueous rubber dispersion into the drums. The drums or containers are frequently unavailable for coating prior to the introduction of the aqueous rubber dispersion into the containers, and the use of a highly efficient stabilizer to prevent coagulation of the rubber in the drums would obviously entail less labor in storage and shipment of rubber latex and other aqueous rubber dispersions.

As the result of numerous experiments in attempting to find a stabilizer which would prevent coagulation of rubber or change of viscosity in aqueous rubber dispersions during shipment or storage in metal containers, I have discovered that a material heretofore used in connection with dyeing in the textile industry has extremely high stabilizing properties when used in connection with rubber latex or other aqueous rubber dispersions, including admixtures of natural rubber latex with artificially prepared aqueous rubber dispersions from reclaimed rubber. The use of comparatively small proportions of the material which I have discovered operates to fully stabilize aqueous rubber dispersions over long periods of time and permits storage of such dispersions and shipment thereof without substantial change taking place in the composition or physical characteristics of the dispersions, and avoids the coating or painting of the inside surfaces of the drums or containers to prevent such coagulation or change.

The stabilizing material for the stabilized aqueous rubber dispersion of the present invention may be formed by the condensation of ethylene oxide and octomethyl glycol at an elevated temperature in accordance with the method or methods as described in the patent to Schoeller et al., No. 1,970,578, patented August 21, 1934. The condensation product which I have found effective in a high degree for the stabilization of aqueous rubber dispersions is in itself old and well known in other relations, as in connection with the dyeing of textiles. This condensation product may comprise ethers, or esters and may be produced in accordance with any of the methods or examples as set forth in the said Schoeller et al. patent. It comprises in general introducing into any water-insoluble organic compounds containing at least one reactive hydrogen atom (i. e., at least one hydroxyl, carboxyl or amino group), polyglycol radicles having at least four ethenoxy groups, as for example the tetra-ethylene glycol radicle, any free hydroxyl groups still present being neutralized with reactive compounds, if desired.

While the various methods disclosed in the examples of the patent are quite diverse, the method of Example 19, on page 6 of the said patent, produces a particularly satisfactory result for the production of the stabilized aqueous rubber dispersions of my invention. The said method as therein disclosed is as follows:

From 660 to 880 parts (15 to 20 molecular proportions) of ethylene oxide are led, while stirring at a temperature between 130° and 140° C. into 270 parts (1 molecular proportion) of octodecyl alcohol containing 2.7 parts of an aqueous caustic soda solution of 40° Bé. The ether thus prepared solidifies into a waxy mass on cooling.

The reaction product obtained by the reaction of ethylene oxide and octodecyl alcohol may be heated with oleic acid to esterify the hydroxyl group, by which a water-soluble ester is obtained in accordance with Example 17 on page 5 of the said Schoeller et al. patent.

A product made under the said Schoeller et al. patent is available on the market and is sold under the name "Emulphor" (Trade-Mark No. 259,507, registered July 30, 1929, Emulsifying agent for use in the textile industry, Class 6) or under the name "Emulphor O."

The stabilizing material made in accordance with the method above described, or obtained under the said trade name, when used in connection with aqueous rubber dispersions appears to have no chemical effect whatever on the latex or aqueous rubber dispersion and the action appears to be wholly physical in its protective effect, being colloidal in nature.

It will be understood that many colloidal dispersions have the property of forming gels on standing. This property is possessed to a certain extent by most latex and rubber dispersion compounds. The gelling action may be hastened by the presence of certain chemicals, and the action may be avoided or retarded by the presence of other chemicals which have a tendency to peptize the gel.

By the use of the "Emulphor" product, or the material prepared in accordance with the method above described, in connection with latex or with aqueous rubber dispersions, the admixture dries uniformly in films of the thickness usually employed or obtained in dipping or coating fabrics in aqueous rubber dispersions, and the drying of the films is accelerated by the presence of the stabilizer. It will be understood that when aqueous rubber dispersions are stabilized with alkalies or soaps, a skin is usually formed during the drying operation. The formation of this skin is very objectionable in dipping and spreading operations where water is trapped under the skin, and the coating does not dry at a uniform rate. The aqueous rubber dispersions stabilized in accordance with my invention overcome this difficulty.

In certain operations involving the use of aqueous rubber dispersions, such as in impregnating porous materials therewith, it is necessary to use a very dilute aqueous rubber dispersion in order to avoid the coagulation of rubber therein caused by the mechanical action of filtering out rubber particles during the passage of the dispersion through the porous mass. By the use of the stabilizer above described in connection with aqueous rubber dispersions, this filtering out of rubber particles is prevented in some unknown manner, and as a result of this action, aqueous rubber dispersions of a much higher solid concentration may be used for impregnation when the stabilizing material above described is employed in connection with the aqueous rubber dispersion.

In the compounding of latex or other aqueous rubber dispersions, it is often desirable to add dry powders or powdered material to the dispersions, rather than to separately disperse the powders in a water paste with the addition of colloidal materials, such as casein or the like, before use or incorporation into the rubber dispersions. In cases where dry powders, such as clay, whiting, cement, or the like, are added to rubber dispersions directly, that is, without pasting in water, coagulation results, or large lumps are left in the dispersion by the local absorption of fluid from the dispersion. When an aqueous rubber dispersion is stabilized by the use of the stabilizing material above described, dry powders may be added to the dispersion without producing premature coagulation, and such mixtures may be kept indefinitely without the production of coagulation therein.

The effect of the use of the stabilizer above described in connection with the expansion joint of my invention may be illustrated by the action of this material on the bentonite constituent of the composition. It is well known that bentonite forms colloidal gels with water on standing. A 6% suspension of bentonite in water produces a gel which is essentially translucent, and which on standing for a relatively short period of time will scarcely pour from the container. If a similar suspension of bentonite in water is prepared in the presence of one-half percent of "Emulphor," or the product produced by the method above referred to under the Schoeller et al. patent, the suspension remains fluid on standing, and instead of appearing translucent, is milky in character. It is apparent therefor that the stabilizer above described inhibits the formation of a gel by the bentonite, and a similar effect is produced by the stabilizer ingredient in the expansion joint composition of my invention, above referred to, and produces homogeneity in the expansion joint composition prior to pouring, without interference, however, with subsequent coagulation and vulcanization of the rubber material after the composition has been poured into place.

The effect of the stabilizing material above described on mixtures of aqueous rubber dispersions in inhibiting gel formation may be explained in connection with a mixture of neoprene latex and natural rubber latex. Neoprene latex when mixed with equal parts of natural latex will produce a decided thickening of the admixture substantially simultaneously or coincident with the mixing, and upon standing the admixture eventually coagulates by progressive thickening. A similar mix of equal parts of neoprene latex and natural rubber latex to which one-half percent of "Emulphor O," or the product produced under the said Schoeller et al. patent, retains its fluidity indefinitely and no noticeable thickening or coagulation takes place. It will be understood that neoprene latex is usually stabilized with soaps and that natural latex is stabilized by ammonia, and it is apparent that the presence of the stabilizing ingredients "Emulphor O," or its equivalent, in the neoprene latex and natural latex admixture prevents some reaction or interaction between the ingredients which without this stabilizing material would disturb the equilibrium of the colloid system. The interaction between the ingredients of the neoprene latex and natural rubber latex admixture without the stabilizing ingredient referred to appears to be similar to the interaction of natural rubber latex and artificial dispersions of reclaimed rubber without the "Emulphor O" or stabilizing agent above referred to. Even in the presence of the ordinary stabilizers as soaps or casein, in the said admixture, a substantial change in the viscosity of the solution takes place, with more or less coagulation of the rubber constituent in the admixture.

In connection with the use of the specific stabilizer above referred to in admixture with aqueous rubber dispersions to which dry powders are to be added, this may be illustrated by the addition of a dry mix of 35 parts of Portland cement with 5 parts of titanium dioxide and 70 parts of ground limestone, which may be mixed in dry form with 50 parts by weight of 60% rubber latex, that is, rubber latex containing 60% of solids and 40% of water, with one percent of "Emulphor O," or the product of a method above described as set forth in the Schoeller et al. patent. With this admixture, the powder ingredients stir readily into the rubber latex without thickening or the production of coagulation. Without the use of the stabilizing ingredient, as above described, the admixture coagulates almost immediately, and other stabilizers, as soaps, casein, etc., heretofore used as stabilizing agents, are wholly ineffective to prevent coagulation in this admixture without the use of the specific stabilizer above referred to. A mixture of Portland cement, titanium dioxide, ground limestone, rubber latex, and "Emulphor O" stabilizer, or its equivalent, as above described may be used as a caulking compound, or as a floor leveller over concrete where linoleum is to be applied, for example. Curing agents, such as accelerators, sulfur, and zinc oxide may be added to the dry fillers without effecting the properties of the mix after the addition of the latex.

In the compounding of latex, where it is desired to make a water paste of dry fillers before adding the same to the latex, the property of "Emulphor O," or its equivalent as produced in accordance with the method above described, enables it to disperse the powders separately before being added to the latex or aqueous rubber dispersion. It is well known that in making pigment paste, different types of pigments require varying amounts of water to obtain a paste of the same fluidity. I have found that pigments may be ground in the "Emulphor O" stabilizer solution and the resulting paste may be added to rubber dispersions without sacrificing any of the benefits of the stabilizing ingredients in the stabilization of the aqueous rubber dispersion.

Pastes of the pigments prepared with the said stabilizer in the manner above described are much more fluid than similar paste which are prepared from solutions of casein or other prior known stabilizers which are ordinarily used for this purpose. By the use of the "Emulphor O" stabilizer, or the product produced by the methods above referred to, incorporating pigments in the form of paste into an aqueous rubber dispersion permits reducing the water content to a considerable extent over the methods and ingredients heretofore used in the preparation of such latex compounds and is particularly advantageous in providing or obtaining a high solid content in the pigment-latex or pigment-aqueous rubber dispersion composition.

The stabilizing ingredient above referred to does not form insoluble compounds with calcium, magnesium or zinc, and is of special value in the compounding of latex or aqueous rubber dispersions where dilution with hard water, containing calcium sulphate or other mineral ingredients, may be necessary. Zinc oxide is generally present in connection with rubber dispersions and rubber compounds as it is necessary for the activation of most accelerators, and generally produces difficulties on account of the effect or influence on the stability of the rubber dispersion, particularly when used with mercapto-benzothiazole accelerators. It is found that the specific stabilizer above referred to effectively prevents the destabilizing effect of the zinc oxide ingredient in aqueous rubber dispersions and in the compounding thereof.

In applying the stabilizing ingredients above described to aqueous rubber dispersions in the making of the expansion joint composition of my invention, as set forth in Patent No. 2,257,083, it is to be understood that the use of other stabilizing agents may be avoided if desired, although the effect of the said stabilizing ingredient is independent of other stabilizing agents heretofore used. The "Emulphor O" stabilizer may be used in the presence of caustic alkalies or other stabilizers, as soaps or casein, without interfering with the action of the "Emulphor O" stabilizer, or the product produced by the methods of the Schoeller et al. patent, as above explained.

It will be understood that various changes or modifications may be made in the stabilized aqueous rubber dispersion and the method of making the same without departing from the spirit or scope of the invention above described and particularly defined in the claims annexed hereto. By the term "Emulphor" or "Emulphor O" as employed in the claims annexed hereto is meant the material or product produced in accordance with the method or methods as set forth in the patent to Schoeller et al., No. 1,970,578, or in accordance with any of the specific examples therein given, unless in the said claims annexed hereto the said product is specifically defined by its characteristics or specific method of manufacture.

Having thus described my invention, what is claimed as new is:

1. A stabilized alkaline aqueous rubber dispersion adapted for storage and shipment without coagulation of rubber constituents thereof which comprises an alkaline aqueous rubber dispersion containing zinc oxide and a condensation product of ethylene oxide and a glycol having at least four ethenoxy groups.

2. A stabilized alkaline aqueous rubber dispersion for storage and shipment in metal containers without the use of coagulation-inhibiting paints on the interior of the said containers to prevent coagulation of the rubber constituent thereof which comprises an alkaline aqueous rubber dispersion containing zinc oxide and a condensation product of ethylene oxide and octodecyl alcohol.

3. A stabilized alkaline aqueous rubber dispersion mixture containing zinc oxide adapted for storage over a long period of time and for shipment without coagulation or precipitation of portions of the rubber constituent which comprises an alkaline aqueous rubber dispersion containing zinc oxide and about ½% to 1% of a condensation product of ethylene oxide and a glycol having at least four ethenoxy groups, said condensation product having a neutral reaction in aqueous solution.

4. A stabilized alkaline aqueous rubber dispersion comprising about 50% alkaline natural latex and 50% of an alkaline aqueous dispersion of reclaimed rubber containing zinc oxide and from ½% to 1% of a condensation product of ethylene oxide and a glycol having at least four ethenoxy groups.

5. A stabilized alkaline aqueous rubber dispersion comprising an alkaline aqueous rubber dispersion, zinc oxide, a mercapto-benzo-thiazole accelerator, a caustic alkali and about ½% to 1% of a condensation product of ethylene oxide and a glycol having at least four ethenoxy groups, to prevent the destabilizing effect of the zinc oxide ingredient in the alkaline aqueous rubber dispersion.

MALCOLM R. BUFFINGTON.

REFERENCES CITED

The following references are of record in the file of this patent:

UNITED STATES PATENTS

| Number | Name | Date |
|---|---|---|
| 1,940,528 | Bond | Dec. 19, 1933 |
| 2,044,046 | Barnard | June 16, 1936 |
| 2,088,407 | Dales et al. | July 27, 1937 |
| 2,215,562 | Ogilby | Sept. 24, 1940 |
| 2,222,967 | Wollthan | Nov. 26, 1940 |
| 2,257,083 | Buffington | Sept. 23, 1941 |